US006532810B1

(12) United States Patent
Ahmed

(10) Patent No.: US 6,532,810 B1
(45) Date of Patent: *Mar. 18, 2003

(54) METHOD AND APPARATUS FOR DETECTING TIMING BELT DAMAGE USING INDUCTIVE LINK COUPLING

(76) Inventor: Adel Abdel Aziz Ahmed, 160 Ridgeview Cir., Princeton, NJ (US) 08540

(*) Notice: Subject to any disclaimer, the term of this patent is extended or adjusted under 35 U.S.C. 154(b) by 0 days.

This patent is subject to a terminal disclaimer.

(21) Appl. No.: 09/939,091

(22) Filed: Aug. 24, 2001

Related U.S. Application Data

(63) Continuation of application No. 09/812,992, filed on Mar. 19, 2001
(60) Provisional application No. 60/190,218, filed on Mar. 17, 2000.

(51) Int. Cl.[7] .............................................. G01M 15/00
(52) U.S. Cl. ....................... 73/119 R; 73/116
(58) Field of Search ................. 73/116, 117.2, 73/117.3, 118.1, 119 R; 340/425.5, 438, 439

(56) References Cited

U.S. PATENT DOCUMENTS

| 1,481,471 A | | 1/1924 | La Londe ........................ 34/55 |
|---|---|---|---|
| 4,462,523 A | | 7/1984 | Kerr ............................ 198/810 |
| 4,488,363 A | | 12/1984 | Jackson et al. .............. 198/810 |
| 4,626,230 A | | 12/1986 | Yasuhara ...................... 474/106 |
| 4,855,709 A | | 8/1989 | Naderi ......................... 340/438 |
| 5,378,206 A | | 1/1995 | Mizuno et al. .............. 474/263 |
| 5,689,067 A | * | 11/1997 | Klein et al. ............... 123/90.17 |
| 5,784,874 A | | 7/1998 | Bruyneel et al. .............. 57/237 |
| 5,994,712 A | | 11/1999 | Mack ..................... 250/559.45 |
| 6,047,593 A | * | 4/2000 | Scher et al. ................ 73/118.1 |
| 6,181,239 B1 | | 1/2001 | Ahmed ........................ 340/439 |

FOREIGN PATENT DOCUMENTS

| JP | 60-50232 | 8/1983 | |
|---|---|---|---|
| JP | 6187588 | 7/1994 | ........... G08C/19/00 |
| JP | 9-60694 | 8/1995 | |
| KR | 10-0188591 | 1/1994 | |
| KR | 0169630 | 4/1997 | |
| KR | 0118378 | 2/1998 | |
| KR | 0164197 | 9/1998 | |
| KR | 10-0189453 | 1/1999 | |

OTHER PUBLICATIONS

Radio Engineers' Handbook, Frederick Emmons Terman, McGraw–Hill Book Company, INC., New York and London, 1943; pp. 48—73, 148–151, and 162–163.
Handbook of Industrial Electronic Circuits, Markus and Zeluff, McGraw–Hill Book Company, Inc., New York, Toronto, and London, 1943; pp. 44–45.
The Radio Amateur's Handbook, Twenty–first edition, 1944; pp. 50–51; publ. by ARRL.
Toyota Landcruiser Station Wagon Trop, 2 pages; marked "http://www.toyota–gib.com/tlesww.htm".

(List continued on next page.)

Primary Examiner—Eric S. McCall

(57) ABSTRACT

A drive belt, such as a toothed belt such as for an automotive or other engine timing belt or a V-belt for driving machinery comprises a belt with a thin conductive wire or strip embedded in the belt material in the form of a closed loop. Such a wire tends to exhibit damage typically some time before belt failure is imminent. First and second coils are coupled by mutual inductance to the closed loop formed by embedded wire which functions as a link coupling between the first and second coils. In one embodiment, an ac current is passed through the first coil and the current in the second coil is monitored for a drop in amplitude when the embedded wire is broken and the closed loop is interrupted.

21 Claims, 9 Drawing Sheets

OTHER PUBLICATIONS

Ignoring timing belt can be costly mistake, by Wade Hoyt, Los Angeles Times Syndicate, Copyright Internet Marketing Solutions, Inc. 1997, 2 pages; marked http://www.lungren-honda.com/S–FYI.html?NOFrame=Service.

Timing Belt Neglect Could Lead To Expensive Engine Repair, 2 pages; provided as a public service by The Gates Rubber Company, marked "http://www.martinsburg.com/car–tune/tbneglet.htm" no date.

Straight Talk . . . about timing belts 1 page; marked "http://www.aeroad.net/carfix/3page3.html" no date.

America on the Road Change That Timing Belt, by Mike Anderson, 3 pages; Copyright 1998; marked "http//www.talkcity.com/autoonramp/aotr/article10.html".

A CAUTION from Gates engineers . . . Free–Running or Interference Engine? 1 page; Sep. 3, 1997; marked "http://www.gates.com/interfer.html".

Walley Plumley, Timing belt warning light, date unknown, pp. 1 and 2 downloaded from the Internet apparently on May 10, 2001 from site: http://www.928oc.org/tip/tip016.htm.

928 Tips Home, Timing Belt Warning Light, date unknown, page 1 downloaded from the Internet, apparently on May 10, 2001from site: http://www.928oc.org/tip/tip046.htm.

Randy Grubbs, Timing Belt Experiences, date unknown, page 1 downloaded from the Internet, apparently on May 10, 2001 from site: http://www.928oc.org/tip313.htm.

* cited by examiner

METHOD AND APPARATUS FOR DETECTING TIMING BELT DAMAGE USING INDUCTIVE LINK COUPLING

CROSS-REFERENCE TO RELATED APPLICATIONS

This application is a continuation of U.S. application Ser. No. 09/812,992 which was filed on Mar. 19, 2001, whereof the benefit is claimed and whereof the disclosure is herein incorporated by reference and which claims the benefit of U.S. Provisional Patent application Serial No. 60/190,218, filed on Mar. 17, 2000.

Reference is also hereby made to two non-provisional patent applications filed by the present inventor: application Ser. No. 09/812,481, filed Mar. 19, 2001, entitled METHOD AND APPARATUS FOR DETECTING TIMING BELT DAMAGE USING LINK-COUPLED BALANCED CIRCUIT, and application Ser. No. 09/812,494, entitled METHOD AND APPARATUS FOR DETECTING TIMING BELT DAMAGE USING LINK-COUPLED FEEDBACK, and whereof the disclosures are hereby incorporated by reference to the extent that they are not incompatible with the present invention.

STATEMENT REGARDING FEDERALLY SPONSORED RESEARCH OR DEVELOPMENT

This invention was not made by an agency of the U.S. Government or under a contract with any agency of the U.S. Government.

INCORPORATION-BY-REFERENCE OF MATERIAL SUBMITTED ON A COMPACT DISC

Not applicable.

REFERENCE TO A MICROFICHE APPENDIX

Not applicable.

BACKGROUND OF THE INVENTION

The present invention relates generally to belt drives and more particularly to a method and apparatus for protection from damage following failure of, for example, a toothed belt drive as utilized for example in timing belt applications. Timing belt failure may result in expensive damage and/or dangerous consequences, so that the detection of incipient belt failure in this application is very useful and important.

Toothed belt drives are commonly utilized for mechanical power transmission, particularly where a correct angular relationship or "timing" between a driving shaft and a driven shaft needs to be accurately maintained.

Vehicles utilizing internal combustion engines typically have a camshaft with spaced cams mounted on the camshaft for opening and closing engine valves in accordance with the requirements of the engine operating cycle. Some engines use a single camshaft whereas others utilize a plurality of camshafts, for example, two camshafts. The camshafts are typically driven by the engine crankshaft which also transmits the engine power through the vehicle transmission to the wheels.

A typical application for a toothed belt drive is, for example, in a four-stroke cycle automotive engine wherein a camshaft used for operating valves runs at one-half the angular velocity or, otherwise expressed, at one-half the revolutions per minute (rpm) of the crankshaft that drives it by way of the toothed belt and wherein the angular position relationship or timing of the camshaft and crankshaft needs to be maintained accurately.

Traditionally in the past, "link chains" or bicycle chain type timing chains, sometimes utilizing double side by side chains, have been used in car engines to couple the crankshaft to the camshaft, using a driven camshaft sprocket having twice as many teeth as a driving crankshaft sprocket. In some engines, a timing gear train has been used to drive the camshaft from the crankshaft.

Chains and gears are both capable of driving a camshaft while maintaining the required timing relationship between the camshaft and the crankshaft. However, the high cost of chain and gear drives and, to some extent, their operating noise level have more recently led to the widespread use of toothed belts for coupling the crankshaft and the camshaft in automotive engines, particularly in smaller engines. A toothed belt drive is quiet and well suited to driving the camshaft while maintaining the required timing relationship to the crankshaft. The same timing belt drive may also be used to drive, for example, a fuel injection pump, an ignition distributor, or some other accessory.

Examples of toothed belt and timing chain drives may be found in, for example, U.S. Pat. No. 5,463,898 entitled METHOD OF DETECTING TIMING APPARATUS MALFUNCTION IN AN ENGINE issued Nov. 7, 1995 in the name of Blander et al.; and U.S. Pat. No. 5,689,067 entitled DIAGNOSTIC METHOD AND APPARATUS FOR MONITORING THE WEAR OF AT LEAST AN ENGINE TIMING CHAIN issued Nov. 18, 1997 in the name of Klein et al., whereof the disclosure is herein incorporated by reference to the extent it is not incompatible with the present invention.

While a toothed timing belt drive offers advantages, the likelihood of belt failure is present. If a timing belt breaks in such an engine, the camshaft will very soon stop rotating, while the crankshaft will typically continue to turn for a time, either due to its rotational momentum and/or because it is coupled to the driving wheels which continue to turn because of the vehicle's momentum.

In some cases, repairing the engine following such a timing belt failure may merely require realigning the camshaft and the crankshaft into proper relationship and replacing the belt. Naturally, the vehicle will be inoperable until the belt is replaced, generally in a repair shop, and the operator may be stranded. Furthermore, since a broken timing belt can cause instant and total loss of power at an unexpected moment, a potentially hazardous traffic situation can result.

Furthermore, in a number of engines, such as those utilizing a high compression ratio, clearance space at the top of the cylinders may be very restricted such that the pistons can only move freely to the top of their stroke with valves in the closed position.

In such an engine, if the crankshaft is rotating and the camshaft stops so that a valve is held open by its cam, interference between a piston and a stopped valve can occur so that a piston can collide with the stopped valve. This generally leads to extensive damage, and possibly ruining the engine so that the cost of repair is no longer economically justifiable. The likelihood that the problem of valve/piston interference will occur in at least one cylinder of such an engine is generally very high upon loss of a timing belt.

When such interference occurs after timing belt breakage, damage may range from a bent valve, and/or a hole in a piston, damage to a cylinder head and/or a camshaft, a gouged cylinder head, to a completely ruined engine. Furthermore, if the car is being driven at the time of the belt failure, the engine may become locked by the collision of a piston with a valve so that the driving wheels may also become locked, thereby possibly creating a hazardous situation in traffic.

As was stated above, the problem of serious damage following timing belt failure is very likely to occur in high compression ratio engines. These include many high-performance engines and compression-ignition or "diesel" engines wherein the very high compression ratio needed for ignition generally leaves insufficient room for a piston to avoid hitting a valve held open by an inoperative camshaft. Despite the problems consequent on timing belt failure, car manufacturers continue to build such "interference engines" which exhibit the problem, apparently because a "free-running engine" with enough clearance results in lower performance. The problem represents a weak point in engine reliability and, given the usually catastrophic damage resulting from timing belt failure, is likely to result in lowering of customer confidence in the product. Utility type vehicles and other vehicles intended to provide dependable performance in remote areas are thereby made less reliable in a rather unpredictable manner.

The problem of serious damage caused by timing belt failure in automotive engines has been addressed to some extent by maintenance schedules for periodically replacing toothed timing belts in such engines at an interval based on the average life expectancy of such belts. For example, an extensive list of "interference engines", that is, engines where serious damage is likely following timing belt failure, was made available by The Gates Rubber Company on the Internet at the address http://www.gates.com/interfer.html. Manufacturer's service manuals generally suggest periodic replacement of the belt as precautionary maintenance every 60,000 to 80,000 miles of driving or so.

One manufacturer is understood to provide a belt replacement warning light which indicates when a prescribed odometer mileage has been reached at which point presumably the belt has become less reliable. Nonetheless, failure may occur at any time before the prescribed mileage has been reached.

However, even periodic scheduled belt replacement can, at best, only reduce the average probability of belt failure: an individual belt may exhibit a shorter operating life than the average and, even with a new belt installed, initial failure remains a possibility, resulting in expensive damage to an engine. Generally, the timing belt in a typical automotive engine is not readily visible to the operator and regular inspection to ascertain the condition of a timing belt is inconvenient, even if it were a reliable way of predicting failure.

Typically, timing belt replacement as a maintenance service requires to be performed by qualified personnel in a repair shop and so is typically not an inexpensive job. In practice, it may not always be performed at the recommended intervals.

Reference is made to applicant's application Ser. No. 09/067,390, entitled METHOD AND APPARATUS FOR TIMING BELT DRIVE, filed Apr. 28, 1998, issued Jan. 30, 2001 as U.S. Pat. No. 6,181,239, whereof the disclosure is hereby incorporated herein by reference to the extent it is not incompatible with the present invention, and which discloses a timing belt system for an engine which includes a first timing belt coupling the camshaft to the crankshaft; a second timing belt coupling the camshaft to the crankshaft; a belt sensor coupled to at least one of the first and second timing belts; and an alarm coupled to the belt sensor. In accordance with an aspect of the afore-mentioned U.S. Pat. No. 6,181,239, a method for driving a camshaft from a crankshaft of an automotive engine comprises: operating first and second toothed belts in parallel so that the engine exhibits a first mode of operation wherein both the first and second timing belts are operating, and a second mode of operation wherein one of the first and second timing belts is broken and only one of the first and second belts is operating; detecting when engine operation changes from the first mode of operation to the second mode of operation; and thereupon alerting the operator, such as by operating an alarm.

The question of timing belt failure and maintenance is extensively reviewed in the references cited in the afore-mentioned U.S. Pat. No. 6,181,239 to which attention is hereby directed.

The problem of belt failure has been addressed in, for example, U.S. Pat. No. 4,488,363 entitled COMBINATION IDLER AND BELT FAILURE SWITCH FOR A DRYER issued Dec. 18, 1984 in the name of Jackson et al., whereof the disclosure is herein incorporated by reference to the extent it is not incompatible with the present invention. In this patent, an arrangement is disclosed for terminating the operation of a dryer upon breakage of the drive belt. It is herein recognized that such an approach will not be useful in avoiding damage due to timing belt failure in an automotive engine, since failure of the timing belt may cause damage to follow immediately upon belt failure and the engine typically cannot practicably be stopped before the damage has taken place.

U.S. Pat. No. 4,626,230 entitled DEVICE FOR SENSING DAMAGE TO A COGGED BELT issued Dec. 2, 1986 in the name of Yasuhara discloses a device that senses deformation of the belt resulting from damage to at least one of the teeth on the belt. The device senses an opening between the belt and the pulley which results from breakage of at least one of the teeth on the belt. When such displacement or an opening is detected, an indicator lamp is lit to report that the belt should be replaced. However, if the belt itself breaks as a result of a damaged tooth, engine damage may still occur.

U.S. Pat. No. 5,994,712 entitled BELT FLAW DETECTOR issued Nov. 30, 1999 and filed Jul. 29, 1997 in the name of Mack discloses a belt flaw detector that has a light source, a sensor, and processing and signaling means to indicate and warn of the flaw in the belt.

An English-language version of Patent Abstracts of Japan, Publication Number 0906069A entitled MONITOR FOR CUTTING OF TIMING BELT OF ENGINE published 04.03.97 in the name of Takahiro discloses an "extremely small conductor" buried under the surface of a timing belt which is disposed between the camshaft and crankshaft of an engine, and which is put into contact with two contacts for supplying a current while the shafts are rotated. A contact setting device is supplied with power from the battery of an automobile and a very small current is passed through one contact, the conductor and the other contact. When the belt is cut, the conductor is cut and the current is cut and under this condition, a signal operates a warning device to warn a driver that the belt is cut, thereby preventing "a secondary disaster" or accident.

As understood from an English-language translation, Japanese patent document No. 9-60694, entitled in a translation "A DEVICE FOR MONITORING ANY CUTOFF OF A TIMING BELT IN AN ENGINE" discloses a conductive wire embedded along with the outer surface of the timing belt. A minute current flows from one contact of a roller form and which rotates in contact with the outer surface of the timing belt, to the conductive wire and further flows to another contact to a controller. In accordance with the translation, if the conductive wire is cut, the controller fails to detect the specified current and an alarm is operated. Other arrangements are also described for monitoring rotation time and ductility of the belt.

Korean patent document No. 169630 with the translated title "AN EARLY SENSING DEVICE FOR SENSING ANY DAMAGE OF A TIMING BELT EARLY IN AN INTERNAL COMBUSTION ENGINE" discloses, in an English language translation, a coil made of a conductor, which is embedded in the inside of the timing belt along with the gear teeth configuration and a steel wire connected with the coil, which is installed in the outer face of the timing belt so that the steel wire may be exposed to the outside of the timing belt. The disclosed arrangement also consists of a sensor supported by a separate supporter, which is installed in contact with the steel wire, an electronic controller through which the sensor is connected with and alarm, and alarm to give an alarm signal depending upon the signal sensed by the sensor.

According to the translation of Korean patent document No. 169630, in case a gear tooth of the timing belt is lost, the coil embedded in the inside of the timing belt along with the gear tooth configuration gets to be cut off If a tooth formed in the timing belt is cut off, the coil embedded in the gear tooth "also gets to be short-circuited (sic)" (so stated in the translation) and therefore the electrical resistance of the coil and the steel wire "gets to be increased infinitely" and the sensor in contact with the steel wire senses the increased electrical resistance and generates a corresponding signal.

Korean patent document No. 169630 also states, in translation, that the steel wire is exposed to the outside of the timing belt so that it may be in direct contact with the sensor or the outer face of the timing belt can be coated with any coating agent having conductivity so that such coating agent may be electrically connected with the coil embedded in the inside of the timing belt and further the sensor may be in contact with the conductive coating agent.

Korean patent document No. 169630 states that the sensor can be of various types. The document discloses a sensor of the contact type and this is stated to be the most preferable sensor for sensing the electrical resistance of the coil and the steel wire. It is further stated in translation in Korean patent document No. 169630 that the sensor can be of the non-contact type so that "such cutoff may be directly and immediately sensed by the sensor." However, it is noted that Korean patent document No. 169630 states that such non-contact type "is not preferable because it requires a complicated installation and operation as well as a high cost.".

The disclosure of the foregoing documents is hereby incorporated by reference to the extent that it is not incompatible with the present invention.

Both Japanese patent document No. 9-60694 and Korean patent document No. 169630 monitor electrically the condition of a wire embedded in a timing belt through mechanical touching of the wire by electrical contacts. Upon undue stretching or deformation of the timing belt, the condition of the wire is altered. The embedded wire can be arranged to break upon the fracture of a belt tooth or undue extension of the belt, either of which conditions can be a precursor of an imminent break in the belt. An early warning can therefore be given of an expected break in a relatively short time, if such systems were to operate reliably.

However, both Japanese patent document No. 9-60694 and Korean patent document No. 169630 use electrical contacts touching rapidly moving wires, so that the contact either slides or rolls on the wire for passing a monitoring current through the imbedded wire for signaling a change in its electrical resistance. It is herein recognized that such sliding or rolling contacts running against a small, fast-moving conductor are notoriously difficult to maintain reliably. Unreliable sliding contacts, particularly for small currents, are known from many everyday examples. A common well-known example is the operation of typical low-voltage electric toy trains, where specks of dirt, rail oxidation, and contact pressure variations tend to interfere frequently with the operation. Sliding contacts against a fine wire embedded in a moving belt are also likely to be highly problematic in practice, particularly in the environment under the engine hood of an automobile vehicle. Fast sliding at high RPM, prolonged use, prolonged non-use, movement, wear, vibration, irregularity in the belt, and dirt and oxidation deposits are likely to render the contact erratic, thereby making the system unreliable and subject to wear. For a system using contacts, the wire is, at least in part, exposed to the outside rather than being completely imbedded in the belt. Contact wear may necessitate frequent and regular contact replacement at an expense comparable to opening the timing belt compartment for belt examination or replacement and is therefore more likely to be neglected. Furthermore, such unreliable operation is particularly undesirable in a warning system for indicating timing belt damage. Typically, an erratic or unreliable warning light or sound will annoy the user and will eventually tend to be ignored, thereby defeating the purpose.

BRIEF SUMMARY OF THE INVENTION

In accordance with an aspect of the invention, apparatus for monitoring a change of condition in a drive belt comprises a first inductance coil; a second inductance coil; an electrically conductive loop associated with the drive belt for motion therewith, the conductive loop forming a mutual inductive link coupling between the first and second inductance coils; and a detector coupled to at least one of the first and second inductance coils for indicating a change in the mutual inductive link coupling.

In accordance with another aspect of the invention, the apparatus comprises a first inductance coil; a source of an alternating current coupled to the first inductance coil; a second inductance coil; an electrically conductive loop coupled for movement with the drive belt, the conductive loop forming a mutual inductive link coupling between the first and second inductance coils for inducing an electromotive force in the second inductance coil; and a detector coupled to the second coil for monitoring a change in the electromotive force in the second coil.

In accordance with another aspect of the invention, a method for monitoring a change of condition in a drive belt comprises the steps of associating an electrically conductive loop for movement with the drive belt; mutually inductively coupling a first inductance coil and the conductive loop; mutually inductively coupling a second inductance coil and the conductive loop, such that the conductive loop forms a link coupling between the first and second inductance coils; passing an alternating current through a first inductance coil; and detecting a change in electromotive force in the second coil.

In accordance with an aspect of the invention, apparatus for monitoring a change of condition in a drive belt comprises a first inductance coil; a second inductance coil; an electrically conductive loop associated with the drive belt for motion therewith, the conductive loop forming a mutual inductive link coupling between the first and second inductance coils; and a detector coupled to at least one of the first and second inductance coils for indicating a change in the mutual inductive link coupling.

In accordance with another aspect of the invention, the detector monitors induced voltage or electromotive force in one of the first and second coils.

In accordance with another aspect of the invention, the conductive loop comprises a conducting wire embedded at least in part in the belt.

In accordance with another aspect of the invention, direct mutual inductive coupling between the first and second coils is small as compared with the mutual inductive coupling provided by the mutual inductive coupling provided by the link coupling.

In accordance with another aspect of the invention, apparatus for monitoring a change of condition in a drive belt comprises a first inductance coil; a source of an alternating current coupled to the first inductance coil; a second inductance coil; an electrically conductive loop coupled for movement with the drive belt, the conductive loop forming a mutual inductive link coupling between the first and second inductance coils for inducing an electromotive force in the second inductance coil; and a detector coupled to the second coil for monitoring a change in the electromotive force in the second coil.

In accordance with another aspect of the invention, the belt is a toothed timing belt and wherein the electrically conductive loop follows a path in the belt in proximity to its teeth for providing an impedance change indication of tooth damage.

In accordance with another aspect of the invention, a method for monitoring a change of condition in a drive belt comprises the steps of: associating an electrically conductive loop for movement with the drive belt; mutually inductively coupling a first inductance coil and the conductive loop; mutually inductively coupling a second inductance coil and the conductive loop, such that the conductive loop forms a link coupling between the first and second inductance coils; passing an alternating current through a first inductance coil; and detecting a change in electromotive force in the second coil.

BRIEF DESCRIPTION OF THE SEVERAL VIEWS OF THE DRAWINGS

The invention will be more fully understood from the following detailed description of the preferred embodiments, in conjunction with the Drawing, in which

FIGS. 12C, 14 and 16 show diagrams for other arrangements for detecting a break in a conductive loop associated with a drive belt, helpful to a further understanding of the present invention.

In the figures, like numerals generally designate the same or similar elements. The figures include schematic representations and are not necessarily to scale.

DETAILED DESCRIPTION OF THE INVENTION

In accordance with an aspect of the invention, a timing belt as for an automotive or other engine comprises a toothed belt with a thin wire embedded in the belt material in the form of a closed loop. First and second coils are coupled by mutual inductance to the closed loop formed by the embedded wire which thus functions as a link coupling between the first and second coils.

In one embodiment, an ac current is passed through the first coil and the current in the second coil is monitored for a drop in amplitude when the embedded wire is broken and the closed loop is interrupted or when the impedance of the loop changes materially as a result of deformation or stressing of the belt and the loop wire.

It is herein further recognized that if the first and second coils are coupled by way of an amplifier in a positive feedback loop including the link coupling provided by the closed loop, feedback oscillations can take place and can be monitored for amplitude to indicate when the closed loop is interrupted by breaking of the embedded wire or when the impedance of the loop increases materially as a result of deformation of the belt and the loop wire.

The afore-mentioned patent application entitled METHOD AND APPARATUS FOR DETECTING TIMING BELT DAMAGE USING NON-CONTACTING LINK FEEDBACK is directed to such apparatus, using such feedback oscillations for detecting a change in the link coupling.

Figure 1A:
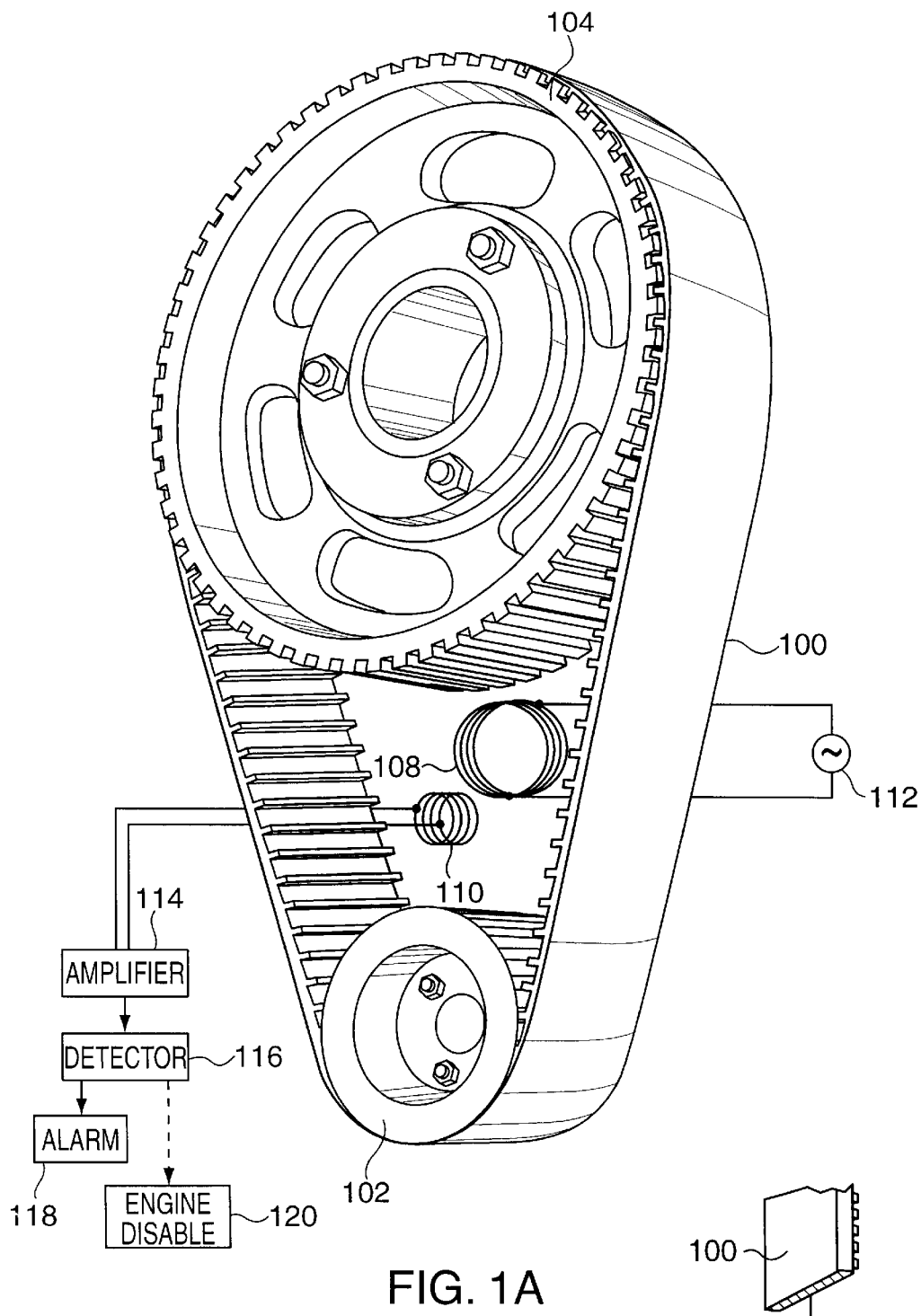
FIG. 1A shows in pictorial/diagrammatic form an embodiment in accordance with aspect of the invention, with FIG. 1B in particular showing an exemplary embodiment of a belt as may be utilized in accordance with the principles of the invention.
Figure 1B:
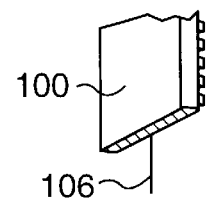

In accordance with an aspect of the present invention, FIG. 1A shows a timing belt 100 for coupling two pulleys 102 and 104. In this embodiment, a conductive wire 106 is embedded in timing belt 100, in a generally similar manner to the belt in publication number 0906069A (Takahiro), as shown in FIG. 1B. The wire forms an endless loop in the belt, thereby forming a one-turn coil or, in other words, a shorted turn having some specified resistance, hereinafter referred to as the "belt wire loop". However, in Takahiro, the embedded wire needs to be at the surface in order to be accessible to the contacting conductors against which it slides. Wire 106 may be embedded at the surface, as disclosed by Takahiro, or it may be mounted on the surface of the belt. It need not be a round wire but may be in the form of a tape, rectangular cross-section, or other convenient form. In accordance with the present invention, as has been stated, the embedded wire need not be at the surface but may, optionally, be embedded more deeply in or under the substance of the belt, as shown in FIG. 1B. In any event, whether wire 106 is more deeply embedded or not, no electrical contact is required with the belt loop or wire, in accordance with the principles of the present invention.

In accordance with an embodiment of the present invention, a first inductor or coil 108, and a second inductor or coil 110, are arranged in relation to the belt so that each of the two coils exhibits mutual inductance coupling to the belt wire loop. Preferably, the two coils are arranged so that direct mutual inductance coupling between the two coils 108 and 110 is as small as conveniently possible.

Accordingly, each of the two coils, 108 and 110, may be considered as one winding of a respective transformer, of which the belt wire loop forms a second winding of each transformer, that is, a winding having one turn which is short-circuited or shorted. Such an arrangement also forms what is known in the electrical engineering art as a "link coupling" between the two coils A and B.

By way of background information, it is noted that mutual inductive coupling using a link coupling is described and explained in various texts such as, for example, in F. E. Terman, RADIO ENGINEERS' HANDBOOK, published by McGraw-Hill Book Company, Inc., New York and London; 1943, on pages 162–163. Useful formulas and information on the calculation of inductive coupling and inductance values can be found on pages 149 et seq. in Professor Terman's above-cited Handbook and in PHYSICAL FORMULAE by T. S. E. Thomas, published in 1953 by Methuen and Co. Ltd., London and New York; Alternating Current Measurements by David Owen, published in 1950 by Methuen and Co. Ltd., London and New York and in other similar books. Other books dealing with link coupling include RADIO ENGINEERING HANDBOOK, ed. Keith Henney, published by McGraw-Hill Book Company, Inc., New York and London, 1959, on pages 5–27 and 5–28. A brief qualitative description of link coupling and inductively coupled circuits generally is provided on pages 50 and 51 of THE RADIO AMATEUR'S HANDBOOK, published by the American Radio Relay League, Incorporated, West Hartford, Conn. in 1943.

Figure 2:
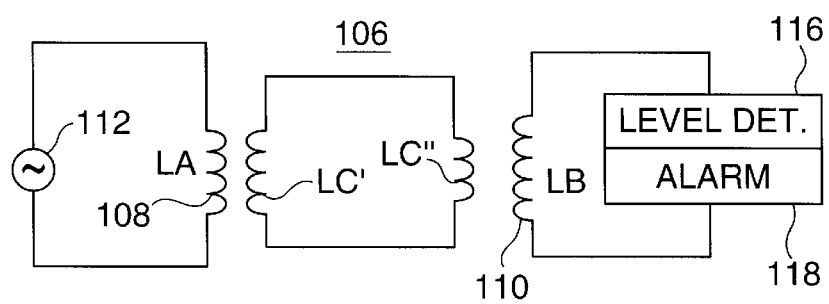
FIG. 2 shows a schematic diagram in accordance with an aspect of the invention.
Figure 6:
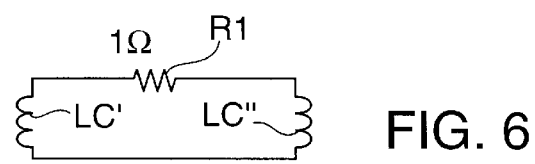
FIG. 6 shows a schematic diagram in accordance with an aspect of the invention.

FIG. 2 shows the configuration schematically as a link coupling. LA represents the inductance of coil 108 and LB represents the inductance of coil 110. The inductance of the belt wire loop when it is intact, that is, when it is not broken, is represented by component portions LC' and LC", to indicate that portion LC' is more closely coupled to coil 108 and that portion LC" is more closely coupled to coil 110. In reality, LC' and LC" are part of the one belt loop. It is noted that the belt wire loop is herein variously referred to as a loop or coil, and it is understood that no limitation is thereby intended unless otherwise stated, since the belt loop in accordance with the principles of the present invention is essentially a conductive loop or band or simply a conductive region or portion of the belt itself. Generally, one turn is all that is required, and in basic embodiments of the present invention such is generally intended; however, more turns, either in series or in parallel with one another can be used. It is also contemplated that, because of the greater length of conductor, a plurality of series turns may make the loop more likely to sustain a break due to early signs of impending belt failure and thus provide earlier warning. Thus, the belt loop in the context of the present invention is intended to encompass single and plural turns as may be appropriate depending on the particular embodiment.

Essentially, coil 108 acts as a primary winding of a first "transformer" with the belt wire loop acting as its secondary winding; the belt wire loop then acts as the primary winding of a second "transformer" with coil 110 acting as its secondary winding. The roles of coil 108 and coil 110 are interchangeable. It is noted that operation of such a link coupling does not require any galvanic connection between any of coil LA, coil LB, and the belt wire loop—the coupling is electromagnetic, by mutual inductance. Accordingly, no electrical contact with the belt loop wire is necessary, thereby avoiding the need for any sliding contacts.

As explained in the afore-mentioned handbook by Terman, the use of a link coupling essentially gives the same behavior as obtainable by ordinary inductive coupling between coil 108 and coil B. Thus, a changing or alternating current (ac) flowing in coil 108 induces an ac current in the belt loop which, in turn, induces an ac current in coil B. This is the same result as occurs when coil 108 and coil 110 are directly inductively coupled together, with this important difference: the belt loop is part of the coupling and if the ac current in the belt loop is interrupted from flowing, the link coupling between 108 and 110 ceases to function and the coupling between coils 108 and 110 essentially ceases to exist, except for stray direct inductive coupling between the coils.

In accordance with an aspect of the present invention, an ac current of suitable frequency is supplied by an ac generator 112 and caused to flow in coil 108, thereby inducing an ac current in the belt wire loop, generally indicated as 106, which, in turn, induces an ac current in coil 110, by way of the link coupling through the belt wire loop 106. The current in coil 110 is monitored by a monitoring circuit comprising an amplifier 114 and a level detector 116. Alternatively, no current need flow in coil 110 and instead, the level of the electromotive force or the voltage induced in coil 110 is monitored for operating an alarm.

If the wire forming the belt loop breaks, the belt wire loop current stops flowing and the current in coil 110 therefore also stops flowing. This is sensed by the monitoring circuit, which then operates a warning or alarm 118 to alert the operator of a fault condition developing in the belt. An optional device or switch 120 for disabling the engine may also be operated in conjunction with or in place of alarm 118. It is also sufficient for the belt wire loop resistance to increase due to mechanical stressing or damage of the wire to cause a decrease in the coupled signal to coil 110 for an alarm to be operated, as will be further explained below. As stated above, no current need flow in coil 110 which may be essentially in open circuit and, in an alternative embodiment, the level of the electromotive force or the voltage induced in coil 110 is monitored for operating an alarm.

Naturally, there may also be some direct inductive coupling between coils 108 and 110; as was stated above, and this is kept as reasonably small as possible by properly selecting the positions of coils 108 and 110. Optionally, direct coupling between coils 108 and 110 can be further reduced by shielding, although it is believed that, with an appropriate constellation of component parts, shielding is typically not needed for operation of the present invention. Experimental data present herein confirms this. In any event, even when some degree of direct coupling is present between coils 108 and 110, nevertheless the breaking of the belt loop wire will generally result in the current level in coil 110 dropping to a lower value, if not zero. To detect a broken wire in the belt loop, it is therefore sufficient for the monitoring circuit to merely detect some level of reduction in current level or electromotive force in coil 110.

Figure 3:
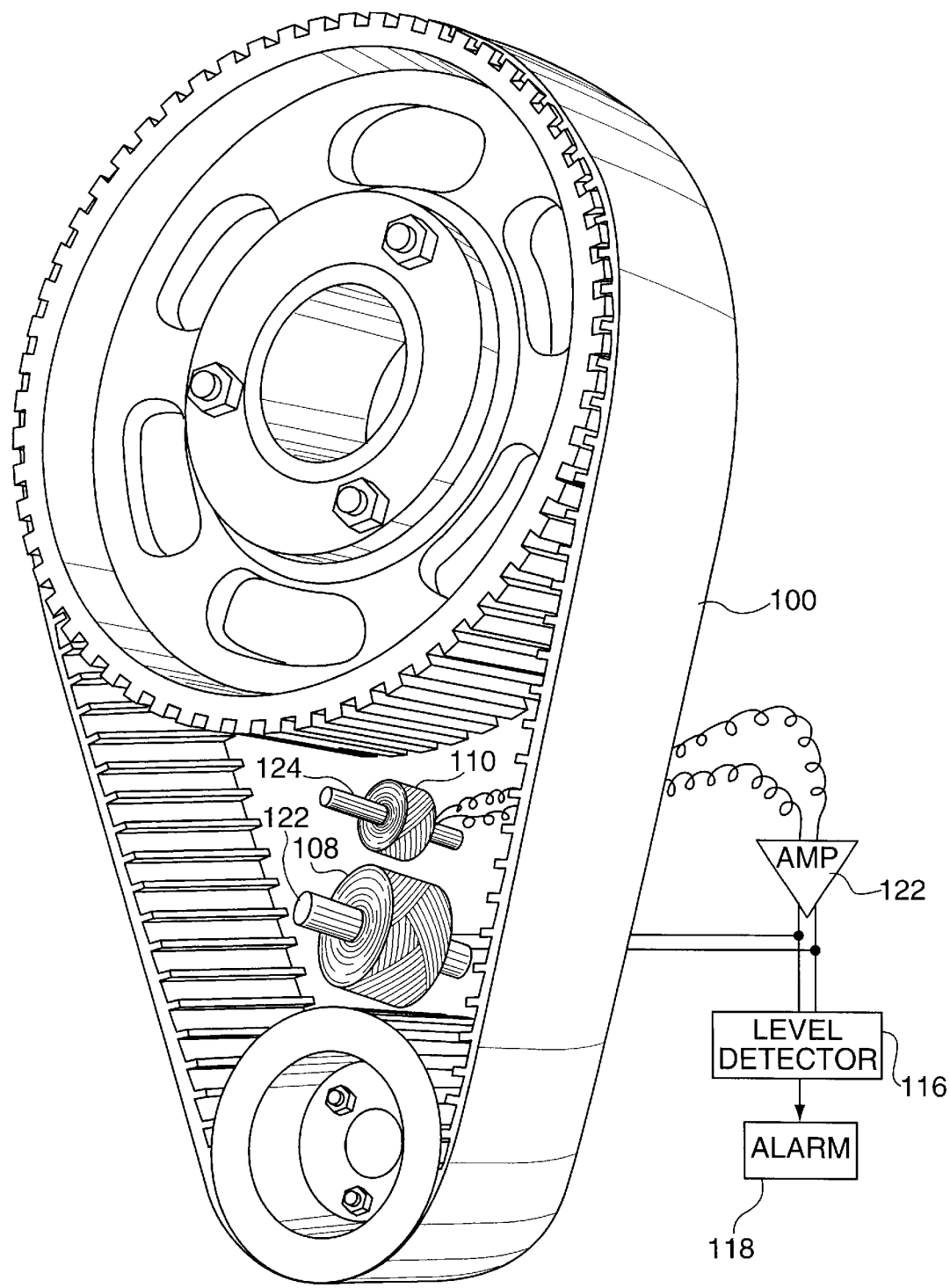
FIGS. 3, 12C, and 16 show in pictorial/diagrammatic form other arrangements for detecting a break in a conductive loop associated with a drive belt, helpful to a further understanding of the present invention.

FIG. 3 shows how the coil set can also be used to detect belt loop damage in another manner, as set forth in applicant's copending patent application filed on even date herewith, entitled METHOD AND APPARATUS FOR DETECTING TIMING BELT DAMAGE USING LINK-COUPLED FEEDBACK. In accordance with the arrangement shown in FIG. 3, an amplifier 122 has its output coupled to coil 108 for causing an ac current to flow through coil 108. As before, coil 108 is inductively coupled to the belt wire loop 106 and the belt wire loop is inductively coupled to coil 110. The output of coil 110 is coupled to the input of amplifier 122. In FIG. 3, coils 108 and 110 are shown as having optional magnetic cores 122 and 124, respectively.

When the amplifier exhibits a certain sufficient amount of amplification or gain and the correct phase shift, oscillations are set up in the feedback loop which comprises the amplifier, coil 108 which is fed by the amplifier output, the belt loop acting as a link coupling, and coil 110 which feeds into the amplifier input. The oscillations are monitored by a monitoring circuit which detects when the oscillations stop and then operates a warning device to alert the operator to a fault condition that has developed in the belt and caused the belt loop wire to break.

In the event that direct inductive coupling between coils 108 and 110 is sufficient to maintain oscillations, nevertheless, the amplitude of the oscillations with the link coupling by way of the belt wire loop will be different from the amplitude without the link coupling. It is therefore sufficient for the monitoring device to detect a predetermined change in the amplitude of the oscillations to determine that the belt loop wire is broken. Otherwise, a neutralizing coil may be utilized to reduce the effect of direct mutual coupling.

As was stated above, applicant's copending patent application entitled METHOD AND APPARATUS FOR DETECTING TIMING BELT DAMAGE USING LINK-COUPLED FEEDBACK is directed to the apparatus using feedback oscillations as described above.

Figure 4:
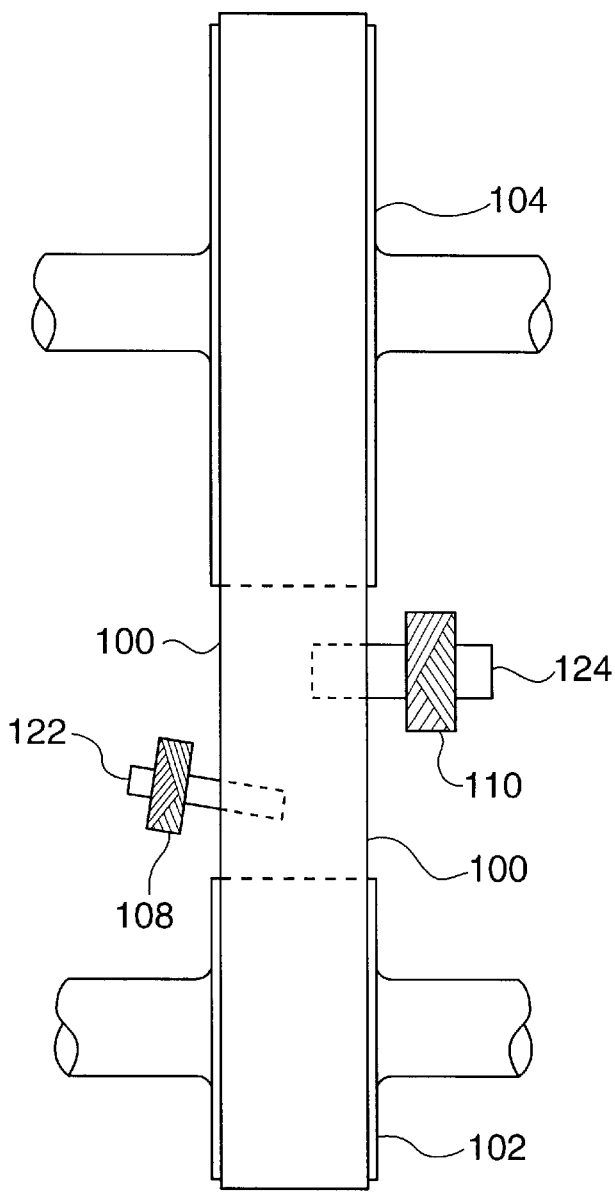
FIG. 4 shows in pictorial/diagrammatic form an embodiment in accordance with an aspect of the invention.

FIG. 4 shows a general side elevation indicating possible arrangements of the coils relative to the belt and pulleys. Coils 108 and 110 are shown as being placed or mounted outside the zone in between the planes bounding the belt, with their respective cores 122 and 124 being within that zone.

Figure 5:
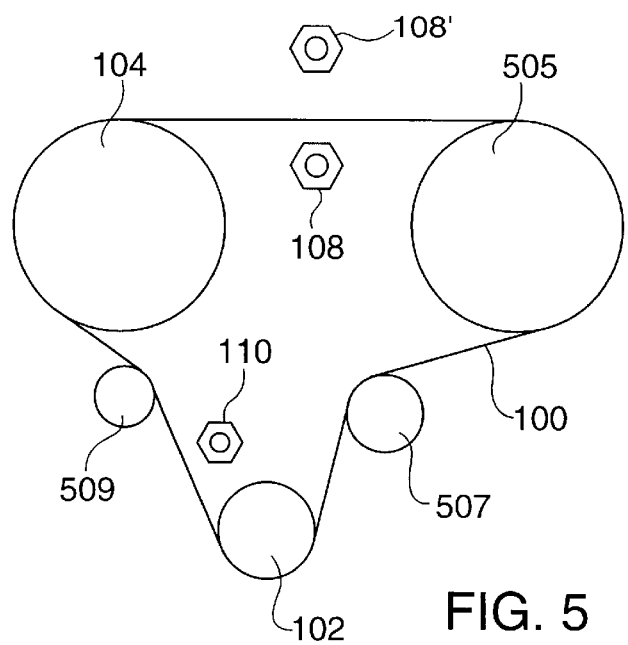
FIG. 5 shows in diagrammatic form an embodiment in accordance with an aspect of the invention.

However, the exact placement of the coils and cores, if any cores are used, involves a considerable degree of freedom and design options. The coils may be on either side of the planes bounding belt 100, between the planes, or both on one side. What is important is that magnetic flux lines emanating from each coil should thread the wire loop as much as practicably possible. As a secondary criterion, the flux lines from each coil should link as little as possible with the other coil. Either one or both of the coils 108 and 110 may be placed outside or inside the belt loop 106, as shown in FIG. 5 where 108 is inside the loop and 108' is outside the loop.

Furthermore, the coils are indicated as multiturn windings with magnetic cores. However, the number of turns and the use of cores is related to impedances of the ac generator 112 and detector 116. Considerable design latitude is available and reference is made to the above-cited Handbook by Terman for design theory for the formulas for link coupled circuits and other engineering design details for inductors.

The coils also need not have parallel axes; for example, coil 108 with core 122 is shown as skewed relative to the axis of coil 110 and core 124. Furthermore, coil 108 with core 122 may also be skewed relative to the planes bounding belt 100. Such skewing is useful in reducing any direct coupling between coils 108 and 110. Shielding may also be used to reduce the effect of such coupling; however, it is not believed to be necessary for providing adequate detection sensitivity for a broken belt wire.

The presence of pulleys over which the belt travels alters the inductance value of the belt wire loop 106, since the pulleys act electrically as shorted turns which, however, do not to any significant degree form link couplings between coils 108 and 110 and the belt wire loop 106 and so do not have any significant effect on the performance of the invention.

In FIG. 5, two camshaft pulleys 104 and 505 are driven by belt 100, as well as an auxiliary driving pulley 507 and a tensioning idler 509. Coils 108 and 110 are shown as being placed adjacent different segments of belt 100. Coil 108' is an alternative position for coil 108.

Figure 8:
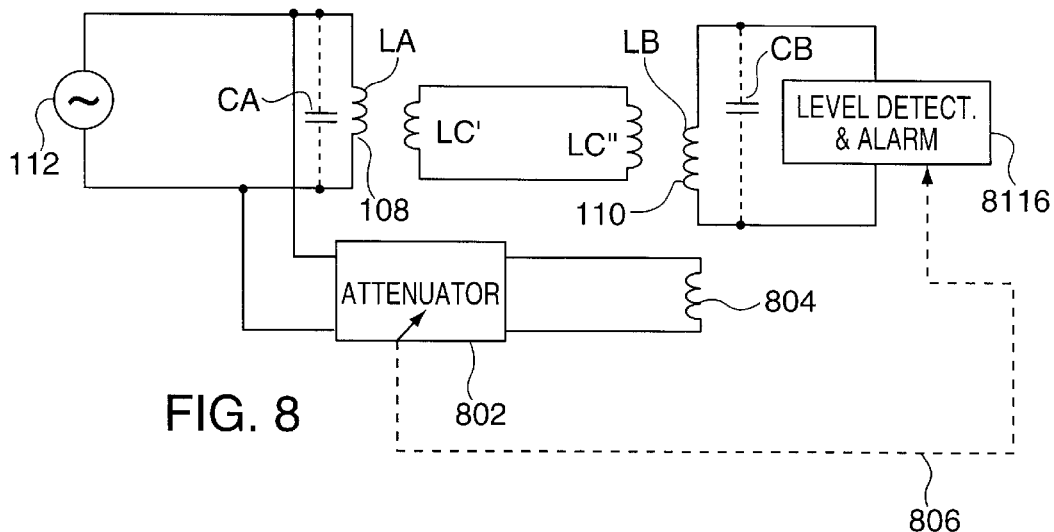
FIGS. 8, 9, and 10 show schematic diagrams illustrating principles in accordance with the invention.

The choice of operating frequency is also a design parameter of considerable latitude. It is convenient to select a frequency near the resonant frequency exhibited by coil 108 in conjunction with the circuit capacitance, so as to provide a large signal. The resonant frequency may be changed by coil design and by adding resonating capacitors CA and CB as indicated in FIG. 8. Typically, a frequency in the range of 1 kHz to 100 kHz is considered convenient as to coil size and impedance levels; however, there is no inherent restriction of the frequency range other than practical engineering design considerations which will set certain upper and lower limits beyond the range mentioned above.

The impedance of the belt wire loop is the impedance of one turn and it will therefore be low as compared with other typical impedances in the circuit. This means that even a small amount of added series resistance will significantly reduce the current circulating in the belt wire loop and will be readily detectable. Thus, the invention provides a sensitive indication of any break in the belt loop wire, as confirmed by the following results.

The following Tables show results obtained in a laboratory set-up. Two iron pulleys were used of about 5 inches diameter (125 mm) with their centers about 10 inches apart (250 mm), so that the length of the belt loop wire was about 36 inches (900 mm). The copper belt loop was 26 AWG with a nominal diameter of 15.94 mils (0.405 mm).

Tests were made with the arrangement resting on a wooden board about ¾ inch (19 mm) thick, and in the cases indicated as using a shield, with an iron plate of about 1/16 inch (1.6 mm) thickness placed under the wooden board. For experiments with added loop resistance, low-value carbon resistors were introduced into the loop circuit to simulate the effect of increased loop resistance. Coils for the function of coils 108 and 110 were radio type multi-turn "universal wound" coils of commercial origin, marked "693 60MH 100 mA R. F. CHOKE". The coils were wound with enameled copper wire measured at about 6 mils (0.15 mm) diameter, which corresponds to about 34 or 35 AWG. The coil dimensions were about 0.97 inch (24.6 mm) outside diameter, ½ inch (12.7 mm) inside diameter, and ⅜ inch (9.5 mm) thickness, similar in appearance to coils 108 and 110 shown in FIGS. 3 and 4. No magnetic core was used in these coils.

The ac input to coil 108 was 3.0 volts RMS at a frequency of about 56 kHz from a signal generator of 600 ohms nominal resistance. It was found that 56 kHz is in the vicinity of a self-resonant frequency for the coils used. The voltage induced in coil 110 was measured at open circuit with an oscilloscope having a 1 Megohm nominal input impedance. The values given in millivolts (mV) are peak-to-peak voltages as measured on the oscilloscope.

It will be understood that the values given do not represent optimized values but rather are some representative values obtained on a breadboard type of set-up for reduction to practice and give an idea of what can be expected even without much refinement. Better values should be obtained with a fully engineered and optimized arrangement. Nevertheless, the values herein presented adequately confirm that the invention functions in practice, as can also be anticipated from the present description.

TABLE 1

Showing voltage induced in L110 with the belt loop intact and with the belt loop open-circuited. The first two rows represent a relatively good positioning of the coils L108 and coil L110 and a relatively less good positioning, respectively. Measurements were made with an iron plate shield close to the set-up. The third row represents measurements with no shield.

| Loop intact | Loop open | Difference mV | Ratio | Shield |
|---|---|---|---|---|
| 100 mV | 4 mV | 96 mv | 25:1 | Yes |
| 68 mV | 14 mV | 54 mV | 4.8:1 | Yes |
| 100 mV | 2 mV | 98 mV | 50:1 | No |

TABLE 2

Showing the effect of adding series resistance to the belt loop. The series resistance of the belt loop, based on the wire gauge of 26 AWG for copper wire, is 0.12 ohms. The measurements were carried out with an iron shield plate close to the set-up.

| Resistance Rs added in series with loop | Ratio of Rs/loop resistance | Induced voltage in coil 110 | Voltage ratio |
|---|---|---|---|
| "Zero" | 0 | 60 mV | 1:1 |
| 0.3 ohm | 2.5 | 40 mV | 1.5:1 |
| 0.6 ohm | 5 | 25 mV | 2.4:1 |
| 1.2 ohm | 10 | 16 mV | 3.75:1 |
| 4.7 ohm | 39 | 9 mV | 6.7:1 |
| "Infinity" | infinite | 2 mV | 30:1 |

It will also be noted that the proximity of a conductive shield in close proximity appears to pose no problem for operation in accordance with the principles of the present invention. This provides some degree of simulation for the environment in a timing belt compartment in an engine.

It is clear that the change in voltage resulting from even a small added resistance can be readily detected using standard techniques of signal processing.

Figure 7:
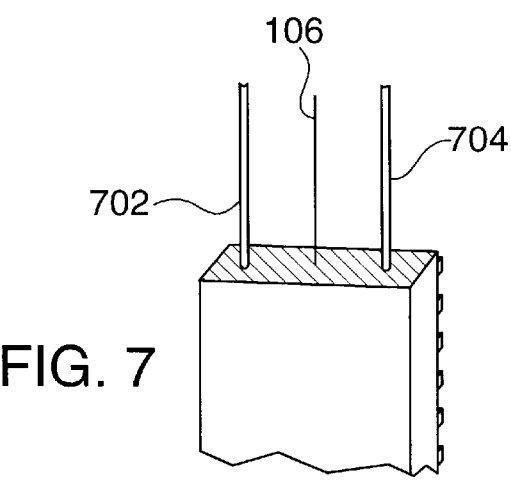
FIG. 7 shows an exemplary embodiment of a belt with embedded conductors as may be utilized in accordance with the invention.

Timing belts may be reinforced and, in the event that an electrically non-conducting reinforcing material such as a plastic or fiberglass reinforcement is used, there will be practically no effect on broken wire detection using the present invention. If an electrically conductive wire reinforcement is used, the reinforcement wire should have a high electrical resistance as compared with the belt wire loop unless it is itself to function as the belt loop for sensing a break. For example, a phosphor bronze wire will exhibit a resistance of about 6.7 times that of an equivalent diameter copper wire; various steels about 8–12 times; titanium about 48 times; and stainless steel about 53 times. If a wire reinforcement needs to be used, it appears theoretically feasible to select a suitable wire reinforcement that will not interfere with operation of the invention. For example, a stainless steel wire with a diameter of about 0.041 inches (about 1 mm) will exhibit a resistance of about 1 ohm. and an ultimate strength of about 117 lb. (about 523 N). FIG. 7 shows part of a timing belt with a cross-section view with the belt wire loop 106 and a pair of reinforcing wires 702 and 704 selected to have a high resistance compared with belt wire loop 106 so as not to interfere with operation of the detection of a broken belt wire loop in accordance with the principles of the present invention.

Figure 15:
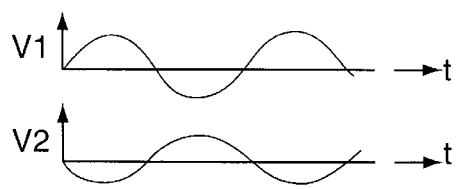

As has been mentioned above, there may be some small amount of direct inductive coupling between coils 108 and 110 and as the ac power coupled from coil 108 to coil 110 by direct inductive coupling does not get transferred by way of belt wire loop link coupling, such direct inductive coupling may tend to reduce the magnitude of the change in amplitude of the current in coil 110 when the belt wire loop breaks and thus to reduce the sensitivity of the system. However, it is herein recognized that if the coils are arranged one on either side of the belt loop 106, then opposite phase signals can be induced in coils 108 and 110, as shown in FIG. 15. This is further explained below in connection with the afore-mentioned copending patent application entitled METHOD AND APPARATUS FOR DETECTING TIMING BELT DAMAGE USING LINK-COUPLED BALANCED CIRCUIT.

FIG. 8 shows an arrangement for suppressing the effect of direct inductively coupled currents. An attenuator 802 has its input coupled across coil 108. At its output, attenuator 802 supplies an attenuated version of the voltage across coil 108 and this attenuated voltage is applied across a bucking coil 804 which is inductively coupled to coil 110. With the belt wire loop not in place, attenuator 802 is adjusted so that the current in bucking coil 804 couples a voltage into coil 110 so as to buck or neutralize any voltage coupled into coil 110 by direct inductively coupling with coil 108. When the belt wire loop is put into its proper place, essentially the only signal appearing across coil 110 will be that coupled by way of the belt wire loop and when the loop is broken there will be essentially no signal present in coil 110, thereby providing a larger change in signal upon a belt wire breaking. Attenuator 802 may optionally included an adjustable phase shifting control. It is further noted that as an alternative to coupling by way of coil 804, it is possible to use a direct coupling by way of a link shown by the dashed line 806 between attenuator/phase adjuster 802 and level detector 8116. A summation of the signals from coil 110 and the signal provided by way of link 804 is made to reduce the effect of direct inductive coupling between coils 108 and 110. As is evident from the measurement data presented above, the problem of stray coupling is not considered significant.

Figure 17:
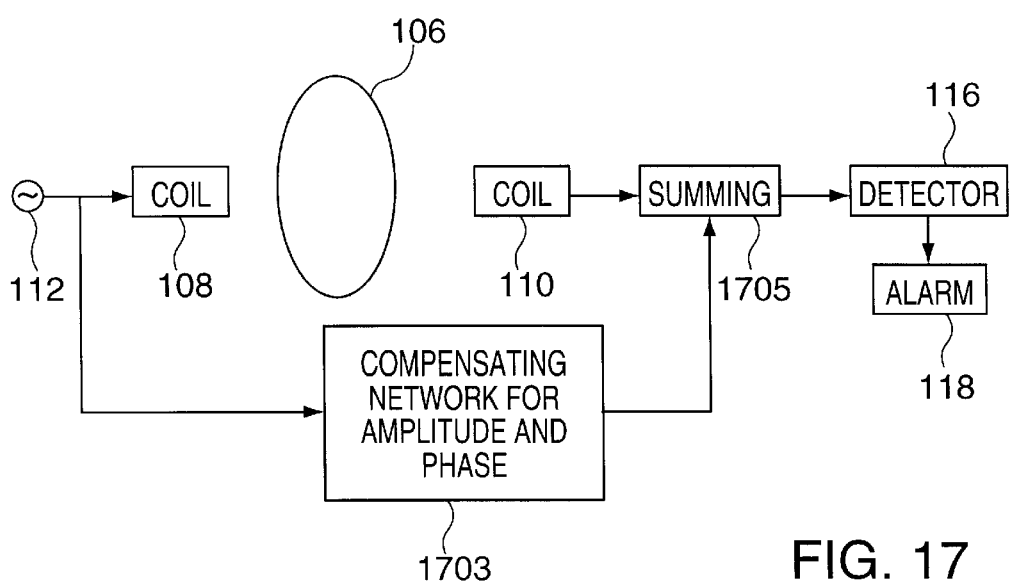
FIG. 17 shows a compensation embodiment in accordance with a principle of the present invention.

FIG. 17 shows another embodiment for reducing the effect of direct inductive coupling between coils 108 and 110. A sample of the signal from source 112 is provided, with appropriate phase and amplitude processing by a network 1703, to a summing network 1705 for summation to the signal induced in coil 110. Thereby a desired level of cancellation is obtained of the signal induced in coil 110 by direct coupling to coil 108. This leaves primarily the signal coupled to coil 110 by the belt loop 106 for further processing by detector 116.

Figure 16:
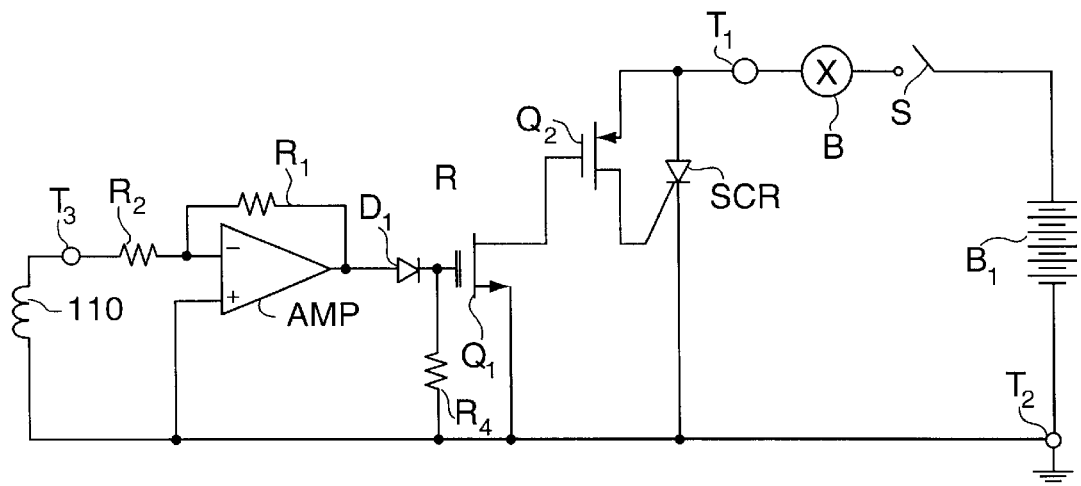

It is also herein recognized that some degree of direct coupling can be used to advantage to off-set or cancel out to some extent the signal produced as a result of the link coupling by way of the belt loop. However, such an arrangement differs from the present invention in that coils 108 and 110 are then placed one on either side of the belt loop so that the inductive link coupling exhibits an opposite sense or sign as compared with the direct inductive coupling between the coils, so as to achieve the cancellation. Alternatively, a circuit such as that shown in FIG. 8 may be used with coil 804 being coupled to provide signals of an opposite polarity sense to those coupled by the belt loop. Moreover, a different detection criterion is then required. In this case, the detection process is reversed to detect an increase in signal which then occurs upon breaking of the belt loop. An example of such a detector is shown in FIG. 16. The afore-mentioned copending patent application entitled METHOD AND APPARATUS FOR DETECTING TIMING BELT DAMAGE USING LINK-COUPLED BALANCED CIRCUIT and being filed by the present inventor on even date herewith is directed to such a arrangement for detecting belt loop failure.

Figure 12A:
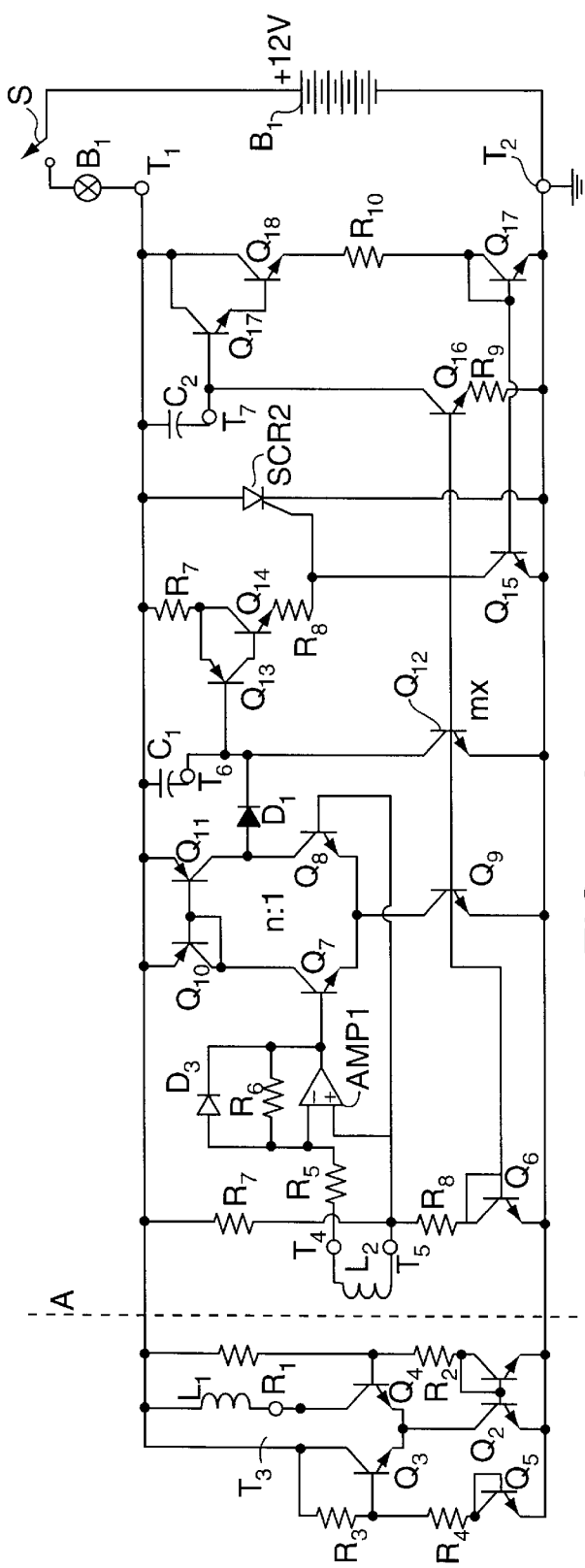
FIGS. 12A, 12B, 13, and 15 show schematics for circuits in accordance with the invention.
Figure 12C:
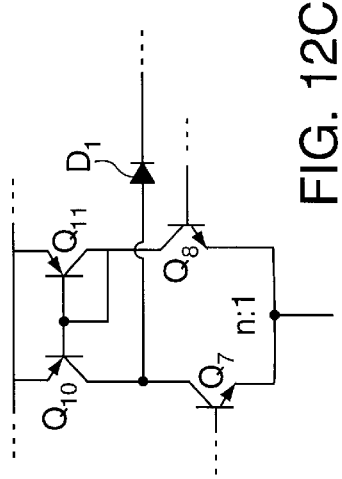
Figure 12B:
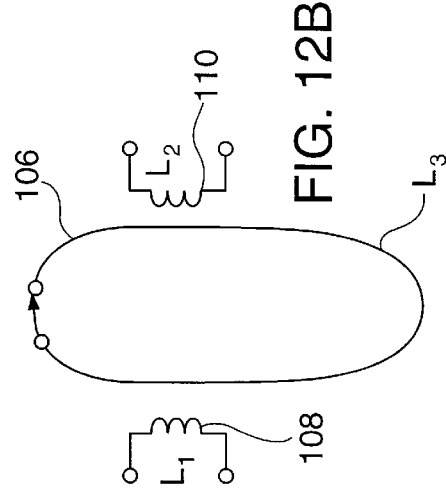
Figure 13:
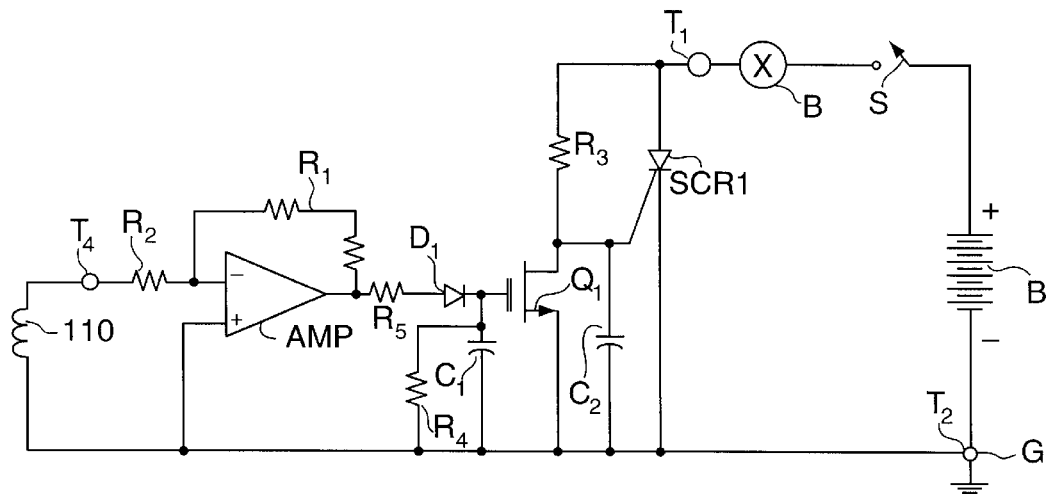
Figure 14:
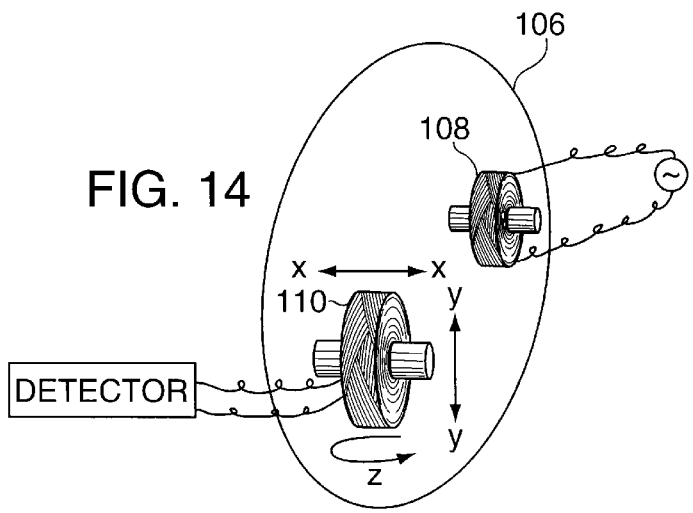

FIGS. 12, 13, and 15 show circuitry and relevant waveforms for detecting an increase in signal consequent upon damage to the belt loop, coil position adjustments for achieving sufficient reduction of the signal resulting from direct inductive coupling, and the related waveforms for such signals.

FIG. 8 also shows the optional use of tuning capacitors CA and CB connected across coils 108 and 110, respectively, for tuning the circuits to a desirable frequency. If no capacitors are used, the coils will resonate at their self-resonant frequencies as determined by the self-capacitance and inductance.

Figure 9:
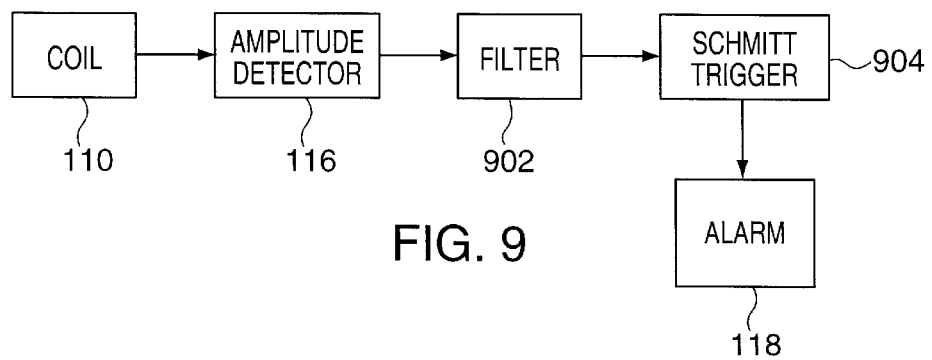

FIG. 9 shows in block diagram form an embodiment in accordance with the present invention for detecting the occurrence of a broken belt wire. The signal, which is coupled into coil 110 by way of the belt wire loop, is coupled to an amplitude detector 116. This may be any suitable detector, such as a half- or full-wave detector, or a synchronous detector utilizing a reference signal from generator or oscillator 112 to derive a dc output level signal proportional to the input signal amplitude. AC components remaining are removed by a filter 902. The filtered output level signal is applied to a Schmitt detector 904 with trip levels appropriately set to operate alarm 118 upon the breaking of the belt wire.

Figure 10:
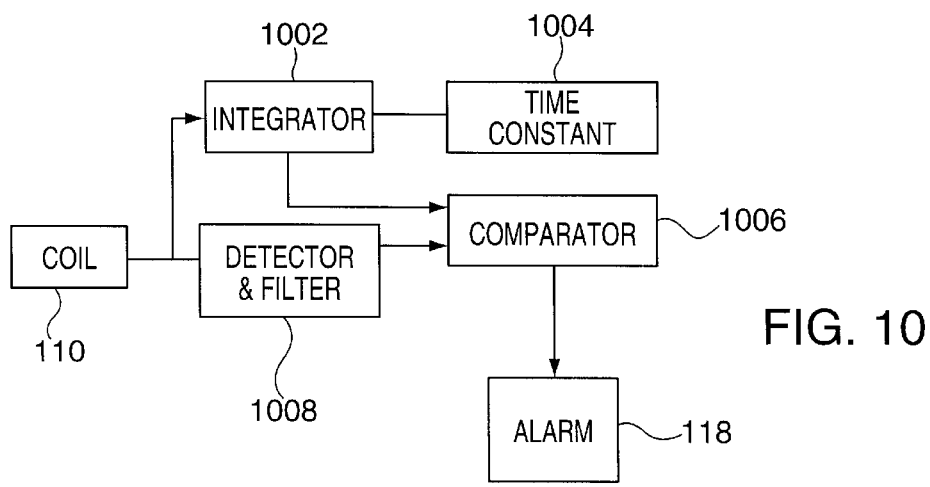

FIG. 10 shows in block diagram form another embodiment in accordance with the present invention for detecting the occurrence of a broken belt wire. The signal, which is coupled into coil 110 by way of the belt wire loop, is coupled to an integrator 1002 which operates in conjunction with a time-constant network 1004 to provide a signal level representative of the long-term average level of the signal from coil 110. This signal is applied to one input of a comparator 1006. The signal from coil 110 is also detected by a detector 1008 which provides a signal level representative of the short term average level of the signal from coil 110 to the other input of comparator 1006. Upon the occurrence of a broken belt wire, the signal from detector 1008 will drop in value as compared with the long-term signal from integrator 1002 which does not vary immediately, thereby causing comparator 1006 to operate alarm 118. By this means, slow long-term variations in signal level caused by parameter drifts with age, temperature extremes and so forth are compensated and the detection level is a relative one rather than an absolute level.

In the interconnection of automotive components and electronics, it is generally desirable to have as few interconnections and wiring as possible, compatible with providing required functions. It is also desirable to try to reduce the number of interconnections passing into and out of compartments. Thus, in implementing a belt damage detector in accordance with the present invention, it is desirable to achieve as small a number as possible of interconnections through the wall of the compartment enclosing the timing belt in an automotive engine. A circuit arrangement is herein proposed for utilizing a single wire connection, with a chassis ground return, to connect to an electronics package in accordance with the present invention, so that only one wire need pass through the timing belt cover wall.

FIG. 12 shows a proposed circuit arrangement for obtaining this result. It is noted that much simpler circuits can be used for detection, such as the circuit of FIG. 13, if more terminals can be accepted in the design. The portion of the circuit to the left of dashed line AA corresponds to sending or transmitting portion and the circuit portion to the right of line AA corresponds to the receiver or detector portion. The transmitting portion can also be used with other receiver portions such as the circuit of FIG. 13.

In FIG. 12A, T1 and T2 are respectively a supply terminal and a ground terminal. Terminal T1 is connected by way of an incandescent bulb B1 and a switch S1 to the positive terminal of a battery D1. The negative terminal of battery D1 is connected to the ground or negative terminal T2 of the circuit. In as much as the great majority of automotive electrical systems utilize a negative ground, battery B1 is shown as having its negative terminal connected to ground terminal T2; however, the circuit is readily adaptable to a reverse polarity positive ground system. Considering first the circuit portion to the left of line AA, a voltage dividing circuit is connected between supply terminal T1 and ground terminal T2, comprising a resistor R1, a second resistor R2 and a diode connected NPN transistor Q1. Transistor Q1 is connected in current mirror fashion with transistor Q2 so that the collector current of transistor Q2 closely equals the current through resistor R2. NPN transistors Q3 and Q4 are connected as a differential amplifier or long-tailed pair with their joint emitters connected to the collector of Q2. The collector of transistor Q3 is connected to supply terminal T1. The collector of transistor Q4 is connected to a terminal T3. Terminal T3 is connected to ground terminal T2 by way of a voltage divider comprising a resistor R3 in series with a resistor R4. The junction point of resistors R3 and R4 is connected to the base electrode of transistor Q3 and the junction point of resistors R1 and R2 is connected to the base electrode of Q4. Terminal T3 is connected to one end of an inductor L1 whose other end is connected to supply terminal T1.

In operation, a supply current flows through resistors R1 and R2 and through diode connected transistor Q1. Accordingly, current mirror output transistor Q2 provides the supply current for differential amplifier transistors Q3 and Q4 emitters. The dividing ratio of the ratio of R1 to R2 is made closely equal to the ratio of R3 to R4 so that under static direct current (DC) conditions the basis of transistors Q3 and Q4, respectively, are at the same potential. However, R3 and R4 provide positive feedback from the collector of transistor Q4 to the base of Q3 and with inductance L1 as a collector load for transistor Q4, oscillations will normally take place at a frequency determined by the circuit constants including the inductance of inductor L1 together with stray circuit capacitances and/or a capacitor C1 optionally connected in parallel with L1.

As shown in FIG. 12B, L1 is inductively coupled to L3 which represents the wire loop embedded in the timing belt.

Considering now the circuit portion to the right of lines AA, an inductor L2 which is coupled to inductor L3 as shown in FIG. 2, is connected between input terminals T4 and T5. An operational amplifier AMP1 has its inverting terminal connected to terminal T4 by way of a resistor R5 and its non-inverting terminal connected to terminal T5. A resistor R6 is connected between the output terminal of amplifier AMP1 and its inverting terminal whereby the overall gain of the amplifier is substantially determined by the ratio of R6 to R5.

A voltage dividing and biasing network comprising a series connection of resistors R7, and R8, with diode connected transistor Q6 is connected between the supply terminal T1 and ground terminal T2. The non-inverting terminal of amplifier AMP1 is connected to the junction point of resistors R7 and R8 thereby establishing the DC operating point. Transistors Q7 and Q8 are connected in differential amplifier configuration with the base of Q7 being connected to the output of amplifier AMP1 and the base of transistor Q8 being connected to the non-inverting input of amplifier AMP1 whereby the output signal of amplifier AMP1 is applied as the differential input signal to differential pair Q7/Q8. Negative output signals of AMP1 are essentially inhibited by diode D3, so that only positive-going signals appear at its output.

The joined emitters of transistors Q7 and Q8 are connected to the collector electrode of an NPN transistor Q9 which is connected as a current mirror output transistor to diode connected transistor Q6 with its emitter and base electrodes connected to those of Q6. Differential pair transistors Q7/Q8 collectors are connected to an active load arrangement comprising transistors Q10 and Q11. The emitter base geometries of transistors Q7 and Q8 are in a junction area ratio of 1:n, where Q8 has the larger geometry. For this reason, under zero differential input signal, transistor Q8 will therefore be in saturation, that is, its collector emitter voltage will become very small.

The joined collectors of transistors Q8 and Q11 constituting the output of the differential amplifier Q7/Q8, which is connected by way of a diode D1 to a terminal T6. Terminal T6 is connected to the collector of a transistor Q12 which is coupled to transistor Q6 so as to provide a further current mirror output in its collector current.

Transistor Q12 is arranged to have an emitter-base junction area geometry in a ratio m:1 relative to the emitter-base area of Q6 so that the current in Q12 and the current in Q6 collectors are in the proportion "m" to "1", where m is small compared with 1. Terminal T6 is also connected to one plate of a capacitor C whose other plate is connected to supply terminal Ti. Terminal T6 is also connected to a PNP/NPN transistor pair Q13 and Q14 which together form a composite PNP transistor. The joined emitter of Q13 and collector of Q14 comprise the emitter of the composite PNP transistor which is connected to supply terminal T1 by way of a resistor R7. The emitter of transistor Q14 which forms the collector electrode of the composite PNP transistor is connected by way of a resistor R8 to the gate electrode of a silicon controlled rectifier (SCR), SR1. The anode of SCR1 is connected to supply terminal T1 and its cathode is connected to ground terminal T2. The emitter of Q14 forming the collector of the composite PNP transistor is connected to the collector electrode of an NPN transistor Q15 whose emitter is connected to ground terminal T2. A terminal T7 is connected to one plate of a capacitor C2 whose other plate is connected to supply terminal T1.

Terminal T7 is also connected to the collector electrode of the transistor Q16. Transistor Q16 has its base connected to the base of transistor Q6 and its emitter connected to ground terminal T2 by way of a resistor R9. Terminal T7 is connected to the base electrode of an NPN transistor Q17 which is connected as a Darlington pair with transistor Q18. The emitter of transistor Q18 which forms the emitter of the Darlington pair is connected by way of a resistor to the joined collector and base electrodes of an NPN transistor Q17 whose emitter is connected to ground terminal T2. The base electrode of transistor Q17 is connected to the base electrode of Q15.

As shown in FIG. 12B, inductor L1 (coil 108) and inductor L2 (coil 110) are coupled to inductor L3 (belt loop 106), corresponding to the conductive loop or wire loop in the timing belt. Accordingly, inductors L1 and L2 are coupled by way of a link coupling comprising inductor L3.

The steady state operation of the circuit will first be described without concern at this point for any switch-on transient phenomenon. In the steady state condition, as will be shown, capacitor C2 is fully charged and transistors Q17, Q18, Q19 and Q15 are essentially non-conducting or cut off. When a voltage is induced in inductor L2 by current in inductor L3 which in turn is caused by current in L1, a signal is applied to the input of the amplifier comprising AMP1. The output signal of this amplifier is applied as an input signal to the differential pair comprising Q7/Q8, and since only positive-going signals are possible because of diode D3, transistor Q7 will conduct more strongly than Q8, whereby diode D1 will be forward biased and the collector of Q1 will keep Q13 and Q14 non-conductive and thereby prevent SCR2 from being triggered on by Q14 emitter current.

When the active load output of differential amplifier Q7/Q8 is a positive current, that is a current in the direction to cause diode Di to conduct, part of this output current flows as the collector current of transistor Q12 and part flows to charge capacitor C1 such that capacitor C1 is essentially discharged. That is, the potential at terminal T6 is very close to the potential of supply terminal T1. This is because the relatively small emitter base area of transistor Q12 causes its collector current to be relatively small compared to the signal output current of the active load of differential amplifier Q7/Q8 under normal operating conditions.

However, should the belt loop inductor L3 break, the signal input to differential pair Q7/Q8 will drop to a much lower level. Because of the larger geometry of Q8, transistors Q7, Q10, and Q11 will conduct less than Q8 and D1 will become reverse biased, thereby causing Q13 and Q14 to turn ON by Q12 collector current as it charged capacitor C1. As capacitor C1 is charged, at some point, transistors Q13 and Q14 will become conductive and will deliver a gate current into SCR2 causing it to turn on. SCR2 will then effectively short supply terminal T1 to ground terminal T2 thereby causing a large current to flow through bulb B1, indicating a broken belt wire.

FIG. 12C shows another embodiment for causing SCR2 to turn on when the signal increases from a small value to a higher value upon breaking of belt loop 106, as is applicable to an embodiment in the afore-mentioned copending patent application entitled METHOD AND APPARATUS FOR DETECTING TIMING BELT DAMAGE USING LINK-COUPLED

BALANCED CIRCUIT.

Considering next the events at turn-on when ignition switch S1 is first turned on, the potential at supply terminal T1 will abruptly increase to the supply voltage of battery B1. Since capacitor C2 is initially discharged, the potential at terminal T7 will also rise to about the same value as the potential at supply terminal T1. Transistors Q17 and Q18 will thereby become conductors and the current through R10 will turn on transistor Q19, which in turn, will turn on transistor Q15.

Strong conduction in transistor Q15 will effectively ground the gate electrode of SCR2, thereby preventing it from turning on. With normal oscillation current present in L1, L2, and L3, a voltage will become established across capacitor C1 corresponding to normal operating conditions, that is, at such a level that Q13 and Q14 are essentially non-conducting. By appropriate choice of current levels and capacitor values, the charging of capacitor C2 by way of the small collector current of Q16, the gate of SCR2 will remain effectively grounded by the collector of transistor Q15 until equilibrium conditions have been established in the remainder of the circuit, as described.

Thereafter, capacitor C2 will become fully charged and the base voltage at Q17 will be insufficient to maintain conduction in R10, whereupon the conduction of transistor Q15 will cease and gate electrode of SCR2 will be no longer clamped by transistor Q15 and will become ready for a turn-on signal from the emitter of Q14 should a break occur in inductor L3.

The initial current through R10 during the turn-on process causes bulb B1 to light up temporarily until capacitor C2 has become sufficiently charged, thereby providing a bulb check on turn-on. Thereafter, bulb B1 will turn off as capacitor C2 becomes more fully charged and the circuit becomes ready for operation.

FIG. 13 shows a simpler circuit for triggering an SCR for providing a warning upon breaking of belt loop 106 or upon an increase in the loop impedance as may result from damage, in accordance with the present invention.

In FIG. 13, coil 110 is coupled by way of a terminal T4 to the inverting terminal of an amplifier AMP, typically an operational amplifier, whose gain is set by feedback resistors R1 and R2 coupled between the output terminal and the non-inverting terminal of AMP. The gate of a field effect transistor (FET) Q1 is coupled by way of a diode D1 and a resistor R5 to the output terminal of AMP and further coupled to ground terminal T2 by way of a resistor R4 in parallel with a capacitor C1. The source of transistor Q1 is grounded and its drain is coupled to a supply terminal T1 by way of a resistor R3 and is further coupled to the gate electrode of SCR1. The gate of SCR1 is coupled to terminal T2 by way of a capacitor C2 and its anode is coupled to terminal T1. Terminal T1 is coupled by way of an indicator bulb B to a switch S coupled to a battery B. Switch S may be, for example, the ignition switch of an automotive electrical system.

In operation with belt loop 106 intact, a full signal will be delivered by coil 110 as previously explained. Positive-going output signals from AMP will keep C1 charged to a positive potential thereby keeping Q1 conductive. Because of diode D1, negative-going signals from AMP will have essentially no effect. This keeps the gate voltage of SCR1 at a low value thereby preventing it from being triggered by current through resistor R3.

If belt loop 106 becomes broken or impaired, the signal from coil 110 will become smaller thereby reducing the amplitude of the output signal from AMP such that capacitor C1 is partially discharged to a voltage below Q1 conduction threshold and Q1 is turned off. This allows R3 to supply current to SCR1 trigger causing it to fire and cause bulb B to indicate a fault condition.

This circuit is adaptable to detecting an increase of signal rather than a decrease upon breakage of the belt loop 106. Such an adaptation is shown in FIG. 16 and has been previously referred to in connection with the copending patent application entitled METHOD AND APPARATUS FOR DETECTING TIMING BELT DAMAGE USING LINK-COUPLED BALANCED CIRCUIT.

It is emphasized that the circuits described for this function are merely exemplary and that the threshold detection function can be provided by a variety of circuits, including Schmitt trigger circuits, diode/transistor threshold circuits, voltage comparators, analog to digital conversion with digital level comparators, electromechanical devices, and so forth.

The functions herein described can generally be performed in an analog or linear circuit manner or the signals can be digitized in a manner well-known in the art and the evaluation, storage, filtering, and comparisons and so forth can be performed digitally as by a computer or a digital signal processing integrated circuit Furthermore, coils 108 and 110 can be air-cored or magnetic-cored, such as by using powdered iron, iron wire bundle, or ferrite cores. An alternative arrangement using magnetic cores is shown 10 diagrammatically in FIG. 11A in side elevation and in 11B in a top view. This arrangement provides tight mutual inductive coupling of each of coils 108 and 110 to the belt wire loop while making it possible to practically eliminate any significant degree of direct inductive coupling between coils 108 and 110.

Figure 11A:
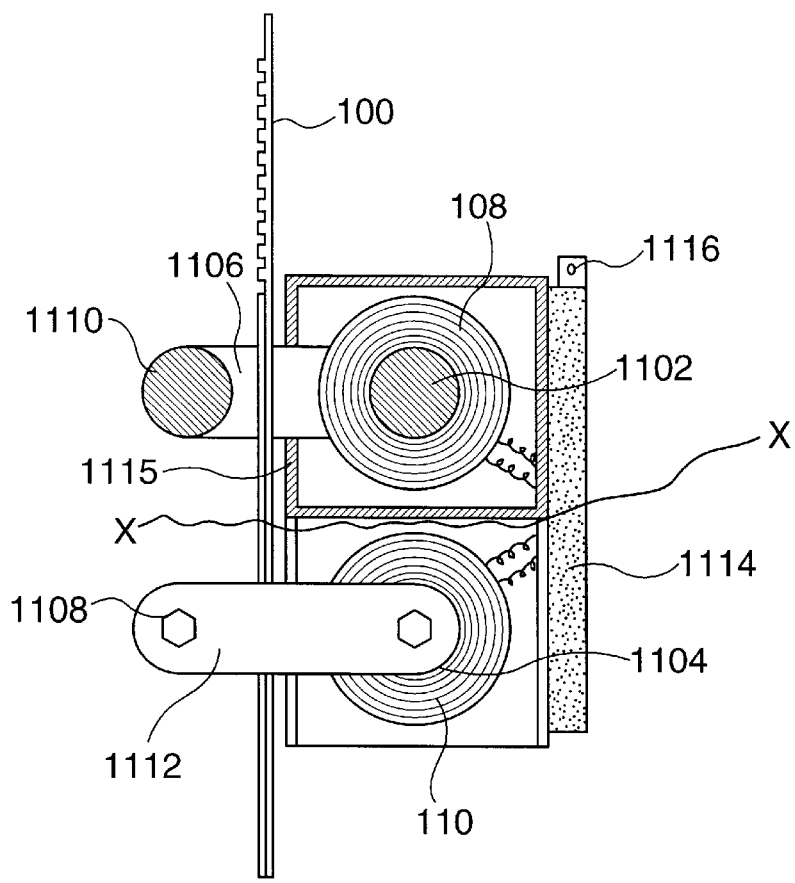
FIG. 11 shows coil arrangements in accordance with the principles of the invention.
Figure 11B:
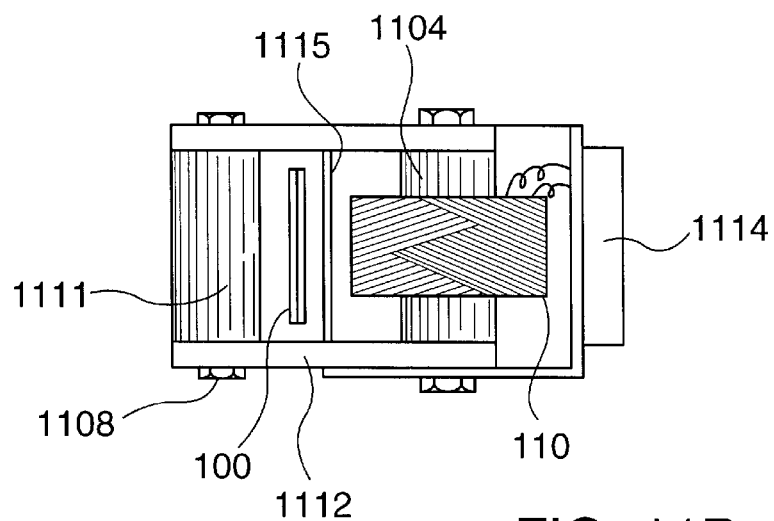

In the view of FIG. 11B, the apparatus is sectioned above section line X—X shown in FIG. 11A. Belt 100 passes through a first magnetic loop core associated with coil 108 and a second magnetic loop core associated with coil 110. The cores are made up of core sections, such as 1102, 1104, 1110, and 1111 and side members such as 1106 and 1112 which are demountably bolted using bolts 1108 to the core sections so as to allow for installation of a replacement endless timing belt. Shielding elements 1115 are provided. In between the coils, the shielding may be in the form of a Faraday shield, that is an electrostatic shield of non-magnetic materials. The signal generating and signal processing is housed in a package 1114 attached to the housing and provided with terminals 1116 for connections. The bucking arrangements described in connection with FIG. 8 are also applicable, if needed, to practically any arrangement of coils 108 and 110, including the arrangement of FIG. 11.

It is contemplated that to a large extent, the circuit can be embodied in an integrated circuit chip.

The described circuit will generate a sine wave type of signal; however, other waveforms may be use such as are readily produced by integrated circuit sources such as multivibrators or other relaxation oscillator forms.

While the description has been in terms of a one-turn loop in the belt, in accordance with another aspect of the invention, as shown in FIGS. 1A and 1B, an imbedded wire 106 in the belt 100 is arranged in a multiturn coil, with the turns arranged side by side along the length of the belt and the ends brought together and joined at a different depth below the adjacent turns so as to form a closed secondary coil with a plurality of turns. A break anywhere in the windings of the secondary coil will cause interruption of its function as a link coupling and will therefore be detected in accordance with the invention.

As has been described in reference to exemplary embodiments in accordance with various aspects of the invention, the electrically conductive loop may comprise a conductor embedded at least in part in the belt. The electrically conductive loop undergoes a change in its impedance indicative of impairment of integrity in the belt. In an embodiment where the belt is a toothed timing belt, the electrically conductive loop may follow a path in the belt in proximity to its teeth for providing an impedance change indication of tooth damage. However, this need not always be the case. The loop path can include portions of the belt where experience shows failure-associated increased stresses are likely to occur. The electrically conductive loop may comprise a conductor having a linear or corrugated path and it may exhibit a prescribed cross-section, such as a round wire, a wire of rectangular section, a flat band and so forth. Essentially, the electrically conductive loop undergoes a stress-induced change in its impedance indicative of impairment of integrity in the belt.

The exemplary embodiments herein disclosed and described are referenced to a toothed timing belt by way of example, but no such limitation is contemplated and the invention is applicable to other applications using, for example, a Vee belt or a flat belt where belt failure may have undesirable consequences and must be guarded against.

The invention has been described by way of exemplary embodiments. It will be apparent that various changes and modifications may be made without departing from the spirit of the invention which is defined by the claims following.

What is claimed is:

1. Apparatus for monitoring a change of condition in a drive belt, said apparatus comprising
   a first inductance coil;
   a second inductance coil;
   an electrically conductive loop associated with said drive belt for motion therewith, said conductive loop exhibiting an impedance change indicative of said change of condition, and forming a mutual inductive link coupling between said first and second inductance coils; and
   a detector coupled to at least one of said first and second inductance coils for indicating a change in said mutual inductive link coupling caused by said impedance change.

2. Apparatus for monitoring a change of condition in a drive belt as recited in claim 1, wherein said detector monitors induced voltage or electromotive force in one of said first and second coils.

3. Apparatus for monitoring a change of condition in a drive belt as recited in claim 2, wherein said conductive loop comprises a conducting wire embedded at least in part in said belt.

4. Apparatus for monitoring a change of condition in a drive belt as recited in claim 2, wherein direct mutual inductive coupling between said first and second coils is small as compared with said mutual inductive coupling provided by said mutual inductive coupling provided by said link coupling.

5. Apparatus for monitoring a change of condition in a drive belt, said apparatus comprising
   a first inductance coil;
   a source of an alternating current coupled to said first inductance coil;
   a second inductance coil;
   an electrically conductive loop coupled for movement with said drive belt, said conductive loop exhibiting an impedance change indicative of said change of condition, and forming a mutual inductive link coupling between said first and second inductance coils for inducing an electromotive force in said second inductance coil; and
   a detector coupled to said second coil for monitoring a change in said electromotive force in said second coil caused by said impedance change.

6. Apparatus for monitoring a change of condition in a drive belt as recited in claim 5, wherein said electrically conductive loop comprises a conductor embedded at least in part in said belt.

7. Apparatus for monitoring a change of condition in a drive belt as recited in claim 6, wherein said electrically conductive loop undergoes a change in its impedance indicative of impairment of integrity in said belt.

8. Apparatus for monitoring a change of condition in a drive belt as recited in claim 7, wherein said belt is a toothed timing belt and wherein said electrically conductive loop follows a path in said belt in proximity to its teeth for providing an impedance change indication of tooth damage.

9. Apparatus for monitoring a change of condition in a drive belt as recited in claim 6, wherein said electrically conductive loop comprises a plurality of turns.

10. Apparatus for monitoring a change of condition in a drive belt by detecting an impedance change in a wire loop at least partially embedded in said drive belt, said wire loop exhibiting an impedance change indicative of said change of condition, said apparatus comprising:
    a first inductance mutually coupled to said wire loop;
    a source of an alternating current coupled to said first inductance;
    a second inductance mutually coupled to said wire loop such that said wire loop forms a link coupling between said first and second inductances; and
    a detector coupled to said second inductance for monitoring a change in induced voltage or electromotive force in said second inductance caused by said impedance change.

11. Apparatus for monitoring a change of condition in a drive belt as recited in claim 10, wherein said electrically conductive loop comprises a conductor having a prescribed cross-section and being embedded at least in part in said belt.

12. Apparatus for monitoring a change of condition in a drive belt as recited in claim 10, wherein said electrically conductive loop undergoes a stress-induced change in its impedance indicative of impairment of integrity in said belt.

13. Apparatus for monitoring a change of condition in a drive belt as recited in claim 10, wherein said belt is a toothed timing belt and wherein said electrically conductive loop follows a path in said belt in proximity to its teeth for providing an impedance change indication of tooth stress.

14. Apparatus for monitoring a change of condition in a drive belt as recited in claim 10, wherein said wire loop comprises a plurality of turns.

15. Apparatus for monitoring a change of condition in a drive belt, said apparatus comprising:
    means for associating an electrically conductive loop for movement with said drive belt such that said electrically conductive loop exhibits an impedance change indicative of said change of condition;
    means for mutually inductively coupling a first inductance coil and said conductive loop;
    means for mutually inductively coupling a second inductance coil and said conductive loop;
    means for passing an alternating current through a first inductance coil; and means for detecting a change in electromotive force in said second coil caused by said impedance change.

16. Apparatus for monitoring a change of condition in a drive belt as recited in claim 15, wherein said electrically conductive loop exhibits an impedance indicative of a degradation of condition in said drive belt.

17. Apparatus for monitoring a change of condition in a drive belt as recited in claim 15, wherein said electrically conductive loop is embedded, at least in part, in said drive belt.

18. Apparatus for monitoring a change of condition in a drive belt as recited in claim 15, wherein said electrically conductive loop comprises a wire of a specified cross-section.

19. A method for monitoring a change of condition in a drive belt, said method comprising the steps of:

associating an electrically conductive loop for movement with said drive belt such that said electrically conductive loop exhibits an impedance change indicative of said change of condition;

mutually inductively coupling a first inductance coil and said conductive loop;

mutually inductively coupling a second inductance coil and said conductive loop, such that said conductive loop forms a link coupling between said first and second inductance coils;

passing an alternating current through a first inductance coil; and detecting a change in electromotive force in said second coil caused by said impedance change.

20. A method for monitoring a change of condition in a drive belt as recited in claim 19, wherein said step of associating an electrically conductive loop for movement with said drive belt comprises embedding a conductor, at least in part, in said belt.

21. Apparatus for monitoring a change of condition in a drive belt, comprising:

means for providing a closed loop conductive path along the length of said drive belt such that said conductive path exhibits an impedance change indicative of said change of condition;

means for providing a first self-inductance and for providing mutual inductance coupling between said means for providing a first self-inductance and said means for providing a closed loop conductive path;

means for providing a second self-inductance and for providing mutual inductance coupling between said means for providing a first self-inductance and said means for providing a closed loop conductive path;

means for applying an alternating current to said means for providing a first self-inductance;

means for detecting electromotive force induced by said current in said means for providing a second self-inductance; and means for detecting a predetermined change in said electromotive force caused by said impedance change.

* * * * *